US007713617B2

(12) United States Patent
Zhou et al.

(10) Patent No.: US 7,713,617 B2
(45) Date of Patent: May 11, 2010

(54) RECORDING MEDIA FOR ELECTROPHOTOGRAPHIC PRINTING

(75) Inventors: Xiaoqi Zhou, San Diego, CA (US); Richard J. Mcmanus, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1189 days.

(21) Appl. No.: 10/842,089

(22) Filed: May 10, 2004

(65) Prior Publication Data

US 2005/0249922 A1 Nov. 10, 2005

(51) Int. Cl.
*B32B 18/00* (2006.01)

(52) U.S. Cl. ................. 428/325; 428/195.1; 428/304.4; 428/327; 428/500; 428/537.5; 428/688

(58) Field of Classification Search ............. 428/195.1, 428/304.4, 325, 327, 500, 537.5, 688
See application file for complete search history.

(56) References Cited

U.S. PATENT DOCUMENTS 3,615,403 A 10/1971 Cheng et al.
3,933,489 A 1/1976 Walters
4,933,246 A * 6/1990 Teuscher ..................... 430/64
5,075,153 A 12/1991 Malhotra
5,719,016 A 2/1998 Christian et al.
5,888,622 A * 3/1999 Pinell et al. .............. 428/195.1
6,261,353 B1 7/2001 Doi et al.
2003/0096130 A1 5/2003 Kegasawa et al.
2003/0224192 A1* 12/2003 Tani et al. ................... 428/485

FOREIGN PATENT DOCUMENTS

DE 3628217 A1 3/1987
EP 0718700 6/1996
EP 0 734 882 A2 10/1996
WO WO 98/42820 10/1998
WO WO 02058929 8/2002

OTHER PUBLICATIONS

Polyethylene glycol Material Safety Data Sheet (MSDS). Jun. 15, 2006.*
Polyethylene glycol—Wikipedia, the free encyclopedia.*

* cited by examiner

*Primary Examiner*—Betelhem Shewareged

(57) ABSTRACT

A charge control composition for controlling the resistivity of recording media used in electrophotographic printing processes is herein disclosed. The charge control composition is included in one or more layers applied to a substrate of the recording media. The charge control composition is an admixture of an electrolyte, a solvent, an organic carrier, and a co-organic carrier. The organic carrier is selected to form and maintain at least some physical and/or chemical bonds with the solvent such that he organic carrier will retain a fraction of the solvent during a high temperature fusion procedure. The co-organic carrier is selected to have a smaller molecular weight than the organic carrier and will also form at least some physical and or chemical bonds with a solvent.

12 Claims, 1 Drawing Sheet

RECORDING MEDIA FOR ELECTROPHOTOGRAPHIC PRINTING

TECHNICAL FIELD OF THE INVENTION

The present invention relates generally to recording media, and more specifically to the coating formulations that contain a charge control additive that forms a part of a coated media used in electrophotographic printing.

BACKGROUND OF THE INVENTION

The electrical resistivity of recording media such as paper intended for use in electrophotographic printing processes is critical to the success of those processes. Dry toners are applied to recording media by means of electrostatic charge. Accordingly, electrostatic charges of a specified magnitude are beneficial and even necessary. However, where the electrical resistivity of the recording media becomes too high, excess electrostatic charges can build up in the recording media, thereby causing such well-known problems as misfeed, double feed increasing of the recording media itself. In addition, excess of electrostatic charges generate artifacts and defected printing images similar to "chicken tracks" or "sharkskin". Alternatively, where the resistivity of recording media is exceptionally low, too little electrostatic charge can build up in the recording media resulting in a low toner transfer efficiency, which in turn translates into a lower and sometimes variable print density in the image.

Accordingly, there is recognized need for inexpensive resistivity control layering for recording media such as paper that is to be used in electrophotographic printing process. More specifically, there is a need for an electrical resistivity control layering that can maintain the resistivity of a recording media within a predetermined suitable range and which is relatively insensitive to changes in the moisture content of the recording media and to the relative humidity of the environment in which the recording media stored. It would also be desirable to provide an electrical resistivity control layering that is relatively light fast and which will not yellow the recording media to which it is applied.

SUMMARY

A coated recording media that includes a charge control additive in the coatings applied thereto addresses the needs described above. This recording media is suitable for electrophotographic printing processes essentially comprises a two-sided substrate, to which is applied a base layer. But for our purposes, it is important to note that the base layer includes a charge control additive or composition formulated according to the present invention. Over the base layer is applied an image receiving layer. This image receiving layer also includes the charge control composition of the present invention. In general, the charge control composition includes electrolyte, a solvent, and an organic carrier.

The present invention also encompasses a method of treating recording media that reduce the effect the relative humidity of the ambient air and the moisture content of the recording media on the resistivity of the recording media. In this method a substrate having a first and a second side's first provided. A base layer coating is an applied to lease one of the first and second sides of the substrate. This base layer includes a charge control additive. Next, an image receiving layer coating is applied to at least one of the first and second sides of the substrate. Typically the image receiving layer is applied over the base layer, but it is envisioned that under appropriate circumstances, the image receiving layer may be applied directly to the substrate itself. The image receiving layer also includes the charge control composition.

DETAILED DESCRIPTION

Figure 1:
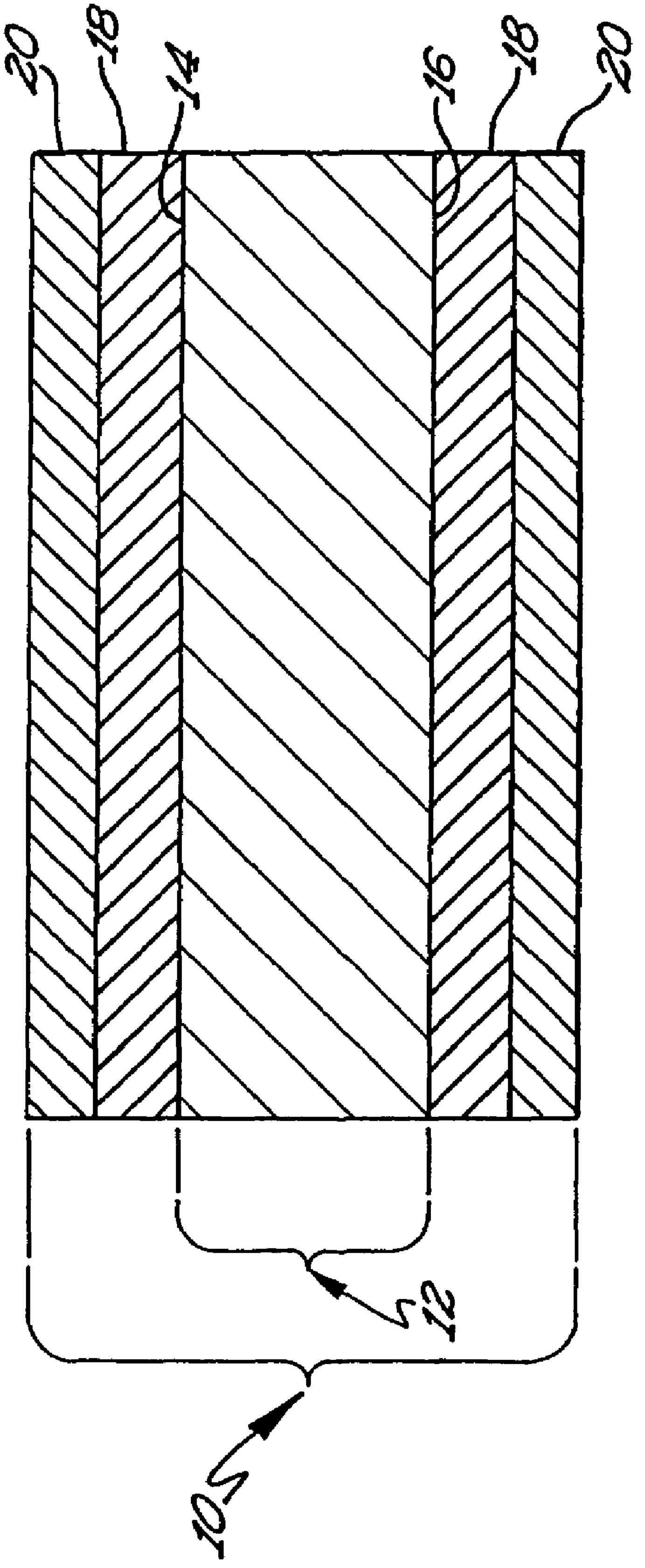
FIG. 1 is schematic cross-sectional view of a layered recording media according to an embodiment of the present invention.

In the following detailed description of the invention, reference is made to the accompanying drawings that form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims and equivalents thereof.

Many types of recording media are used in electrophotographic printing processes. By far the most common is paper, but other types of recording media such as plastic film are also used. As used herein, the term "recording media" may be used interchangeably with the term "paper". Note that this substitution is one of convenience and that the term "recording media" is to be construed so as to include any media suitable for use in printing processes including, but not limited to, laser, inkjet, and digital printing processes.

FIG. 1 illustrates a typical, layered sheet 10 of recording media. The layered sheet 10 as a substrate 12 that may be a paper or plastic film. The substrate 12 has a first side 14 and a second side 16. Applied directly to the first and second sides 14, 16 of the substrate 12 is a base layering or layer 18. Applied directly over this base layering or layer 18 is a top layer or layer 20. The base and top layers 18, 20 serve to smooth the surface of the substrate 12 and also modify the final optical, chemical, and electrical characteristics of the sheet 10.

In certain applications it may be desirable to omit one or more of the layers 18, 20 from the sheet 10. For instance, where only a single side of the sheet 10 is to be printed upon, the top layer or layer 20 may be omitted from one side of the substrate 12. What is more, in some instances it may be desirable to omit both the base and top layers 18, 20 from one of the sides 14, 16 of the substrate 12.

The base layer 18 comprises a base composition that is applied to the sheet 10 in a known manner. The base composition (and layers or coatings formed therefrom) may include inorganic pigments, binders, and the charge control additive. The top layer 20 comprises an image receiving composition. The image receiving composition (and layers formed therefrom) can include inorganic pigments, polymeric hollow particle pigments, binders and a charge control additive.

Suitable inorganic pigments may be provided in a powder or slurry form. Examples of suitable inorganic pigments include, but are not limited to, titanium dioxide, hydrated alumina, calcium carbonate, barium sulfate, silica, clays (such as high brightness kaolin clays) and zinc oxide. By way of example only, one suitable inorganic pigment that has desirable properties is calcium carbonate. The calcium carbonate may be ground calcium carbonate (GCC) or may be a chemical precipitated calcium carbonate (PCC). Such desirable properties include high brightness, gloss, opacity, good rheology, and good coating ability. Additionally, calcium carbonate is relatively economical to obtain. In both the base layer 18 and the top layer 20, the inorganic pigments can be loaded to a maximum level without increasing cost, as the cost of a coating solution containing these particulates is typically more inexpensive than paper pulp. This combination provides a high performance, low cost layered paper compared to plain paper having a similar weight.

Binders adhere the inorganic pigments in the base layer 18 to the sheet 10 and also adhere the inorganic pigments and plastic hollow particles in the top layer. Suitable binders include water-soluble polymers such as polyvinyl alcohol, starch derivatives, gelatin, cellulose derivatives, acrylamide polymers, or water dispersible polymers such as acrylic polymers or copolymers, vinyl acetate latex, polyesters, vinylidene chloride latex, and styrene-butadiene or acrylonitrile-butadiene copolymer latex.

Plastic hollow pigments are water dispersed, polymeric hollow spherical particles filled with water. As the layers that have been applied to the sheet dry, the plastic hollow pigments lose water as well, leaving a hollow air filled core. In one embodiment, plastic pigments are made of a styrene emulsion polymerization with a glass transition temperature (TG) of about 100° C. The plastic hollow pigments are non-film forming in ambient conditions and remain as discrete particles during coating. Hollow particulates like the plastic hollow pigments can have a void volume that is between 20% and 70% of its total volume of material. In one embodiment, the particulate plastic hollow pigments have a particulate size from about 0.3 μm to about 2 μm and/or a glass transition temperature (TG) from about 50° C. to about 120° C. Examples of other suitable plastic hollow pigments that can be used in accordance with embodiments of the present invention include Ropaque BC-643, Ropaque HP-543, or Ropaque OP-84, all manufactured by Rohm and Haas Company, Philadelphia, Pa., USA and HS-3000NA, which is available from The Dow Chemical Company, Midland, Mich., USA.

Aside from the major components described above and the charge control additive detailed in the next paragraphs, small amount of coating additives can also be present in the layer compositions. Such additives include dyes to control paper color, optical brightness agents, lubricants, surfactants, rheological modifiers, cross-linkers (such as for water proofing), deformers, and/or dispersing agents, to name but a few examples.

In order to modify the electrical characteristics of the sheet 10, a discharge control additive is blended with at least one of the base and top layers 18, 20. Preferably, the charge control additive will be combined with both the base and top layers 18, 20, but may be combined with only one of the respective layers. The discharge control additive places the resistivity of the sheet 10 somewhere in a range between about $1\times10^{6}$ ohms/square and $1\times10^{15}$ ohms/square, and more preferably in a range of $1\times10^{9}$ ohms/square to and $1\times10^{13}$ ohms/square.

The discharge control additive is a mixture of an electrolyte and a liquid carrier. The electrolyte donates free electrons to the layers 18, 20 in the presence of the liquid carrier so as to lower the inherent resistivity of the substrate 12. Suitable electrolytes include, but are not limited to ionizable inorganic salts, organic electrolytes, and low molecular weight polymeric electrolytes. Specific examples of some suitable electrolytes include sodium chloride, calcium chloride, potassium chloride, and aluminum chloride; monovalent inorganic and organic salts such as citrate, lactate, and acetate; tetraalkyl ammonium salts such as tetraethyl ammonium bromide; and low polymeric weight inorganic and organic salts of polyvinylacrylates.

The liquid carrier includes a solvent, an organic carrier, and an optional co-organic carrier. The solvent is chosen such that the electrolyte will fully dissolve therein. The solvent must have one or more reactive functional chemical group(s) such as a hydroxyl group, a carboxyl group, or a group that has at least one atom of oxygen, nitrogen, fluorine, sulphur, chlorine, bromine and iodine. The solvent will normally include hydrogen atoms. These functional groups and/or electronegative atoms are able to form chemical and/or physical bonds with the organic carrier such that the molecules of the organic carrier are bonded with the solvent molecules even at elevated temperatures such as those present in an image fusing procedure commonly used in electrophotographic printing. One type of solvent that is suitable is an aqueous solvent, preferably distilled or deionized water. Other types of solvents in which the electrolytes will dissolve and which are compatible with the organic carrier and the co-organic carrier may also be used.

The organic carrier is preferably a liquid, or will assume a liquid state when mixed with a suitable solvent. The organic carrier must be miscible in all concentrations and proportions with the solvent and is preferably completely soluble in the solvent over the range of temperatures at which the base and top layers 18, 20 are formulated and applied to the substrate 12 of sheet 10. The evaporative behavior of the organic carrier over the aforementioned range of temperatures and at the elevated temperature present in such processing steps as layer application, web drying, and image fusing is preferably minimized. Accordingly, it is preferred to specify organic carriers having a flash point and/or boiling point above 200° C.

Another desirable characteristic of the organic carrier is that one or more reactive functional chemical group(s) such as a hydroxyl group, a carboxyl group and/or a group consisting of at least one atom of oxygen, nitrogen, fluorine, sulphur, chlorine, bromine, iodine, and/or hydrogen are present in the main molecular structure. These reactive functional chemical group(s) and/or atoms may be present in the backbone of a molecular chain or may be grafted thereto as a side chain as in the case of a polymer. These functional groups and/or electronegative atoms are able to form chemical and/or physical bonds with the solvent molecules so that the organic carrier molecules will remain bonded with the solvent molecules even at elevated temperatures such as those present in an image fusing procedure common to electrophotographic printing.

Suitable organic carriers include, but are not limited to polyethylene glycol, polypropylene glycol, polyoxyalkylene glycols, and ethyloxylated sorbitan fatty acid esters. Molecular mobility of the organic carrier plays a vital role in determining the performance of a discharge control additive. Molecules that are too mobile, i.e. have very low viscosities, are generally volatile at elevated temperatures. The loss of solvents from these carriers may strand conductive ions in isolated localities, resulting in uneven discharge properties. On the other hand, large carrier molecules have a bulk structure that results in very high viscosities, which may also negatively affect the mobility of conductive ions. It is well known in the art that the mobility of carrier molecules is related to the molecular weight of the carrier molecules. When polyethylene glycol, for example, is used as an organic carrier in formulating the present invention, the molecular weight is preferably specified as being between about 200-2000 and more preferably between 400-600. These ranges of molecular weights result in a desirable mobility that can be used as a comparator in selecting other suitable organic carriers, i.e. other suitable organic carriers will have a molecular mobility that is similar to that of polyethylene glycol having a molecular weight within the above-identified ranges.

The optional co-organic carrier may be added to the charge control additive formulation to increase the ability of the solvent to bond with the organic carrier. The co-organic carrier is preferably an organic compound that is miscible with both the solvent and organic carrier of the liquid carrier. The co-organic carrier generally has a smaller molecular weight than that of the organic carrier yet has one or more functional group(s) having at least one atom of oxygen, nitrogen, fluorine, sulphur, chlorine, bromine and iodine. The co-organic carrier also normally includes hydrogen atoms in its molecular structure. Suitable co-organic carriers can be small molecular weight organic compounds or organic oligomers with lower degree of polymerization. The co-organic carrier will also form at least some multiple physical and/or chemical bonds, such as a hydrogen bond, with the solvent and the organic carrier. Substances having single or multiple hydroxyl groups such as glycerol, for example, may be used as a co-organic carrier. Where a co-organic carrier is included with the organic carrier, the ratio of organic carrier to co-organic carrier is generally about 15:1 to 5:1, and more preferably about 10:1.

The purpose of the discharge control additive is to render the resistivity of the sheet 10 more independent of the relative humidity of the atmosphere and the moisture content of the sheets 10. This independence is important to maintaining high image quality when the sheets 10 are used as the recording media in duplex color electrophotographic printing. In duplex electrophotographic printing, each side of the sheet 10 of recording media is subjected to an image fusing process that fixes the colorants that have been applied to the respective sides of the sheet 10. The elevated temperatures used during the image fusing process dramatically reduce the moisture content of the sheet 10 and thereby modify the surface electrical resistivity thereof. Because each side of the sheet 10 is subjected the image fusing process, where a moisture-sensitive charge control additive is used in the layers 18, 20 of the sheet 10, the surface electrical resistivity of the second side of the sheet 10 to be fused will be significantly higher than that of the first side that was fused. The higher surface and volume resistivity of the second side of the sheet 10 of recording media will create printing defects commonly referred to as "chicken tracks" or "sharkskin".

Without limiting the present invention to any single mechanism of operation, it is believed that the organic and co-organic carriers retain within their molecular structures a quantity of the solvent, which ensures that the electrolyte of the charge control additive will remain active with respect to the resistivity of the recording media, independent of relative humidity and moisture content as stated above. While relative humidity and moisture content may still affect the resistivity of the recording media, such effect is buffered by the relatively constant ionic activity retained within the organic and co-organic carriers. Accordingly, by using the charge control additive of the present invention, it becomes easier to maintain the resistivity of recording media within a predetermined range of resistivities, even where the recording media is subjected to a duplex color electrophotographic printing process and its image fusing processes.

Regarding the amounts of each component that can be present in each layer, 100 parts by weight of inorganic pigments can be used as a constant FIGURE. Thus, a base layer composition can include 100 parts by weight inorganic pigments, from 1 to 15 parts by weight binder, and from 5 to 20 parts by weight charge control additive. Likewise, the image receiving composition may include 100 parts inorganic pigments, from 3 to 10 parts hollow particles, and from 1 to 5 parts charge control agent. These ranges are provided as guidelines, and can be altered to achieve a desired affect. Additionally, various coating weights and thickness can be applied for each coating. For example, each base layer can be applied at a coating weight from 5 to 30 g/m$^2$, and in another embodiment, from 10 to 15 g/m$^2$. Additionally, each receiving layer can be applied at a coating weight from 5 to 30 g/m$^2$, and in another embodiment, from 10 to 15 g/m$^2$. Further, in a more detailed embodiment, each base layer and top layer can be applied at from about 10 μm to 15 μm in thickness.

As described above, base layer(s) 18 and top layer(s) 20 can be applied to a single side of a sheet 10, though preferably, it is applied to both sides of the sheet 10. Both base and top layers can be applied using an on-machine or off-machine coater. Examples of suitable coating techniques include, but are not limited to, slotting die coaters, roller coaters, fountain curtain coaters, blade coaters, rod coaters, air knife coaters, gravure application, airbrush application and other techniques and apparatuses known to those skilled in the arts.

The base layers and the top layers may be applied singly or simultaneously, with a coating weight of about 5 to 30 g/m$^2$ for the respective base and top layers. In a preferred embodiment, the coating weight is about 10 to 15 g/m$^2$ for each of the base and top layers. The solids content of the respective compositions that make up the base and top layers can range from about 50 wt % to 75 wt %, with a viscosity of about 200 cps to 2500 cps as measured using a low shear Brookfield viscometer at a speed of 100 rpm. When measured at a higher shear rate of about 4500 rpm and using a high shear Hercules viscometer, the viscosity of the aforementioned compositions is about 30 cps to 70 cps. Once applied, the layers may be dried by convection, conduction, infrared radiation, or other known methods. After coating the recording media with the base composition and the image receiving composition, a calendaring process can be used to achieve desired gloss or surface smoothness. The calendaring device can be a separate super-calendaring machine, an on-line soft nip calendaring unit, an off-line soft nip calendaring machine, or the like.

EXAMPLES

Examples 1-7 are of various formulations of a discharge control additive according to the present invention.

Example 1

0.5-3.0% sodium chloride;
10.0-30.0% polyethylene glycol;
3.0-10.0% glycerol; and,
60.0-85.0% deionized water.

Example 2

0.5-3.0% sodium chloride;
10.0-30.0% polyethylene glycol;
60.0-85.0% deionized water.

Example 3

0.5-3.0% aluminum chlorohydrate;
10.0-30.0% polyethylene glycol;
3.0-10.0% glycerol; and,
60.0-85.0% deionized water.

Example 4

0.5-3.0% calcium chloride;
10.0-30.0% polyethylene glycol;
3.0-10.0% glycerol; and,
60.0-85.0% deionized water.

Example 5

0.5-3.0% magnesium chloride;
10.0-30.0% polyethylene glycol;
3.0-10.0% glycerol; and,
60.0-85.0% deionized water.

Example 6

0.5-3.0% aluminum chlorohydrate;
10.0-30.0% polyoxyalkylene glycols;
3.0-10.0% glycerol; and,
60.0-85.0% deionized water.

Example 7

0.5-3.0% sodium chloride;
10.0-30.0% ethyoxylated sorbitan fatty acid esters;
3.0-10.0% glycerol; and,
60.0-85.0% deionized water.

While commercial embodiments of the charge control additive will be produced using industrial methods, examples 1-7 were produced under laboratory testing conditions as follows: the electrolytes were mixed with a solvent such as deionized water in a glass beaker. This mixture was then stirred at room temperature until substantially all solid particles present in the mixture had dissolved. The organic carrier and optional co-organic carriers were then added to the mixture and stirring then continued for an additional 20-30 minutes at room temperature.

The discharge control additives prepared in examples 1-7 exhibited a strong ability to adjust and stabilize both the surface and volume resistivities of a sheet 10 of a recording media having a substrate 12 of paper. Even in severe printing environments having a temperature as low as 15° C. and a relative humidity of 10%, the base and top layer formulations containing the charge control additive of the present invention reduced image defect related to electrostatic buildup and discharge to negligible amounts.

Example 8

An exemplary embodiment of a base layer 18 intended for application to a substrate 12 of recording media sheet 10 included the following ingredients:

100 parts ground calcium carbonate slurry;
4-10 parts polystyrene-butadiene copolymer latex;
5-10 parts charge control additive as formulated in examples 1-7;
0.2-0.6 parts rheology modifier; and,
0.001 parts colorant.

Example 9

An exemplary embodiment of a top layer 20 for receiving an image and intended for application to a substrate 12, preferably over a base layer 18, may include the following ingredients:

100 parts chemical precipitated calcium carbonate slurry;
4-10 parts polystyrene-butadiene copolymer latex;
3-5 parts charge control additive as formulated in examples 1-7;
3-5 parts polystyrene hollow particle latex;
0.2-0.6 parts rheology modifier;
0.001 parts colorant; and,
0.5-1.0 parts optical brightener.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

What is claimed is:

1. A recording media for electrophotographic printing processes comprising:
a substrate having a first and a second side; and
an image receiving layer applied to at least one of the first and the second sides of the substrate;
wherein said image receiving layer is formed from an image-receiving composition comprising:
inorganic pigments;
a polymer binder;
polymeric hollow pigments; and
a charge control composition,
wherein said charge control composition is a solution comprising:
(i) a solvent, (ii) an electrolyte dissolved in the solvent and selected from a group consisting of ionizable inorganic salts, and organic salts, and (iii) liquid polyethylene glycol having a molecular weight between about 200 to about 400, the liquid polyethylene glycol having functional groups that form chemical bonds with the solvent and that are completely soluble in the solvent.

2. The recording media of claim 1 wherein the substrate is chosen from a group consisting of paper and plastic film.

3. The recording media of claim 1 wherein the charge control composition further comprises a co-organic carrier having functional groups that form hydrogen bonds with the liquid polyethylene glycol and the solvent, and a smaller molecular weight than that of the organic carrier.

4. The recording media of claim 1 wherein the electrolyte is chosen from a group consisting of sodium chloride, calcium chloride, potassium chloride, aluminum chloride, citrate, lactate, acetate, tetra-alkyl ammonium salts, organic salts of polyvinylacrylates, and inorganic salts of polyvinylacrylates.

5. The recording media of claim 3 wherein the co-organic carrier comprises at least one chemical functional group chosen from a group consisting of at least one atom of oxygen, hydrogen, nitrogen, fluorine, sulphur, chlorine, bromine and iodine.

6. The recording media of claim 5 wherein the co-organic carrier is glycerol.

7. The recording media of claim 1, the image receiving composition comprising:
about 100 parts inorganic pigments, the pigments having a particle size of about 0.01-100 micrometers;
about 1-30 parts polymer binder;
about 1-10 parts of polymeric hollow pigments; and
about 1-20 parts charge control composition.

8. The recording media of claim 1 comprising a base layer applied to each of the first and the second sides of the substrate.

9. The recording media of claim 1 comprising an image receiving layer applied to each of the first and the second sides of the substrate.

10. The recording media of claim 1 wherein the charge control composition is a mixture of:

0.5-3.0% an electrolyte selected from a group consisting of ionizable inorganic salts;

10.0-30.0% liquid polyethylene glycol;

60.0-85.0% deionized water as said solvent.

11. The recording media of claim 3 wherein the charge control composition is a mixture of:

0.5-3.0% an electrolyte selected from a group consisting of ionizable inorganic salts;

10.0-30.0% liquid polyethylene glycol;

3.0-10.0% co-organic carrier; and 60.0-85.0% deionized water as said solvent.

12. The recording media of claim 1 further comprising a base layer between the image receiving layer and the substrate, wherein said base layer is formed from a base composition comprising: (a) inorganic pigments; (b) a polymer binder; and (c) a charge control composition, wherein the charge control composition in the base composition is a solution comprising:

(i) a solvent, (ii) an electrolyte dissolved in the solvent and selected from a group consisting of ionizable inorganic salts, and organic salts, and (iii) liquid polyethylene glycol having a molecular weight between about 200 to about 400, the liquid polyethylene glycol having functional groups that form chemical bonds with the solvent and that are completely soluble in the solvent.

* * * * *